United States Patent
Ohno et al.

(10) Patent No.: US 8,534,895 B2
(45) Date of Patent: Sep. 17, 2013

(54) LIGHT EMITTING DEVICE WITH A POINT-LIKE LIGHT SOURCE

(75) Inventors: Yasuo Ohno, Kitasaku-gun (JP); Takuro Sakai, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 61 days.

(21) Appl. No.: 13/371,861

(22) Filed: Feb. 13, 2012

(65) Prior Publication Data

US 2012/0268965 A1  Oct. 25, 2012

(30) Foreign Application Priority Data

Apr. 21, 2011 (JP) .................................. 2011-095070

(51) Int. Cl.
*F21V 7/04* (2006.01)
(52) U.S. Cl.
USPC .......................................... 362/606; 362/607
(58) Field of Classification Search
USPC ................ 362/606, 633, 632, 634, 628, 97.1, 362/97.3, 609, 623, 608, 607, 612; 349/61, 349/62, 63, 64, 65, 69
See application file for complete search history.

(56) References Cited

U.S. PATENT DOCUMENTS

| | | | | |
|---|---|---|---|---|
| 7,073,933 B2* | 7/2006 | Gotoh et al. | ................... | 362/624 |
| 7,564,517 B2* | 7/2009 | Daiku et al. | .................... | 349/62 |
| 7,929,214 B2* | 4/2011 | Teijido et al. | ................. | 359/629 |
| 2009/0213569 A1* | 8/2009 | Kim et al. | .................... | 362/97.1 |

FOREIGN PATENT DOCUMENTS

| JP | A-2004-184612 | 7/2004 |
|---|---|---|
| JP | A-2006-349987 | 12/2006 |

* cited by examiner

*Primary Examiner* — Mariceli Santiago
*Assistant Examiner* — Glenn Zimmerman
(74) *Attorney, Agent, or Firm* — Oliff & Berridge, PLC

(57) ABSTRACT

A light emitting device comprises: a light guiding plate including two facing principal surfaces and circumferential end surfaces connecting the principal surfaces; and a point-like light source facing at least one surface of the circumferential end surfaces of the light guiding plate. One surface of the circumferential end surfaces except the surface where the light source is arranged is a light emitting surface, the thickness of the light guiding plate facing the light source is smaller than the thickness of a portion constituting the light emitting surface and is smaller than the thickness of a light emitting surface of the light source, a diffusing unit is formed on at least one of the principal surfaces; and a reflection member covering peripheries of the light source and the light guiding plate except portions constituting the light emitting surfaces of the light source and the light guiding plate is provided.

8 Claims, 5 Drawing Sheets

LIGHT EMITTING DEVICE WITH A POINT-LIKE LIGHT SOURCE

BACKGROUND OF THE INVENTION

1. Field of the Invention

The present invention relates to a light emitting device, especially to a light emitting device being configured to improve uniformity of luminance of the light emitting device using a point-like light source without depending on the element length of a light guiding body.

2. Description of the Related Art

In recent years, a light emitting device that uses a white light emitting diode (LED) as a light source has been widely applied for the backlight of electronic apparatuses. Since point-like emission of the LED generally has a wide angle distribution, a rod integrator has been conventionally used to configure the LED as a light emitting device having a uniform illumination distribution.

Figure 4A:
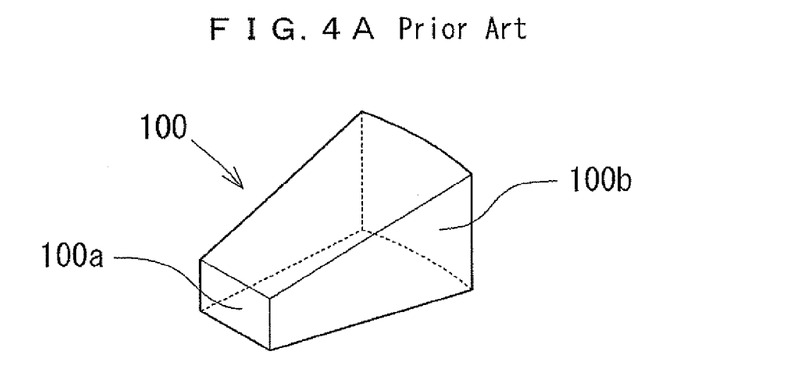
FIG. 4A is a perspective view illustrating a solid rod integrator.

The rod integrator is configured using glass or a transparent resin. Known examples of the rod integrator include a solid rod integrator 100 illustrated in FIG. 4A and a hollow rod integrator 102 illustrated in FIG. 4B. The rod integrator 100 has a light incident surface 100a which is disposed to face LEDs and a light emitting surface 100b that faces the light incident surface 100a. In the solid rod integrator 100, light that has been emitted from the LED is introduced into a solid inner portion through the light incident surface 100a. The light is then adapted to advance toward the light emitting surface 100b while repeating total reflection. Accordingly, the luminance of the light emitting surface 100b can be equalized (see Japanese Patent Application Laid-Open No. 2004-184612).

Figure 4B:
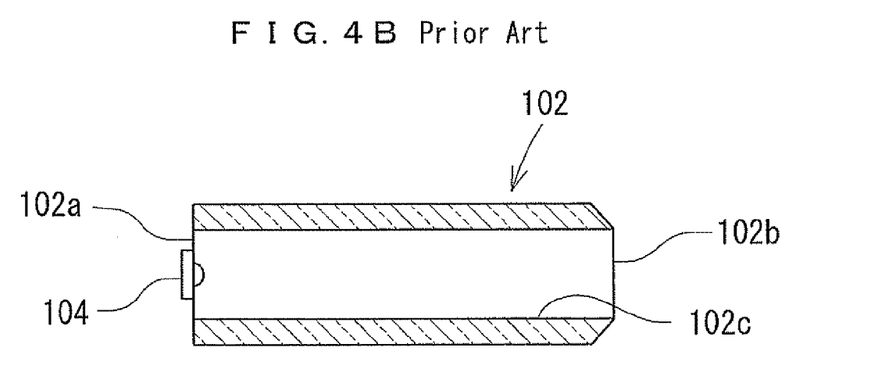
FIG. 4B is a cross-sectional view illustrating a hollow rod integrator.

On the other hand, the hollow rod integrator 102 also has a light incident end 102a which is disposed to face LEDs 104 and a light emitting end 102b that faces the light incident end 102a. In the hollow rod integrator 102, light emitted from the LED 104 is introduced into a hollow inner portion through the light incident end 102a. The light is then adapted to advance toward the light emitting end 102b while repeating total reflection by means of an inner surface 102c. Accordingly, the luminance of an irradiation object (not shown) such as a spatial light modulating device that is arranged in the light emitting end 102b can be equalized (see Japanese Patent Application Laid-Open No. 2006-349987).

Figure 5A:
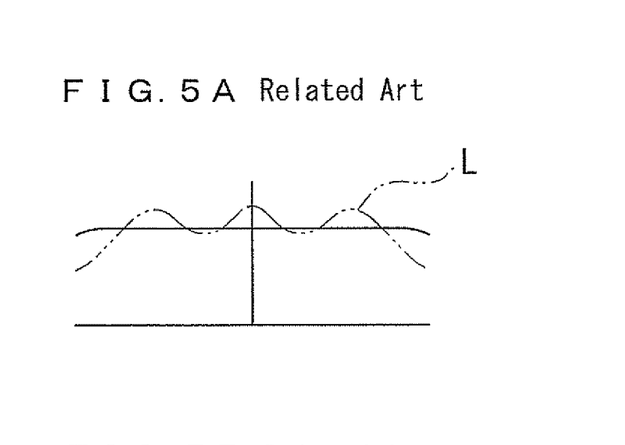
FIG. 5A is a graph illustrating a luminance distribution of a light guiding plate.
Figure 5B:
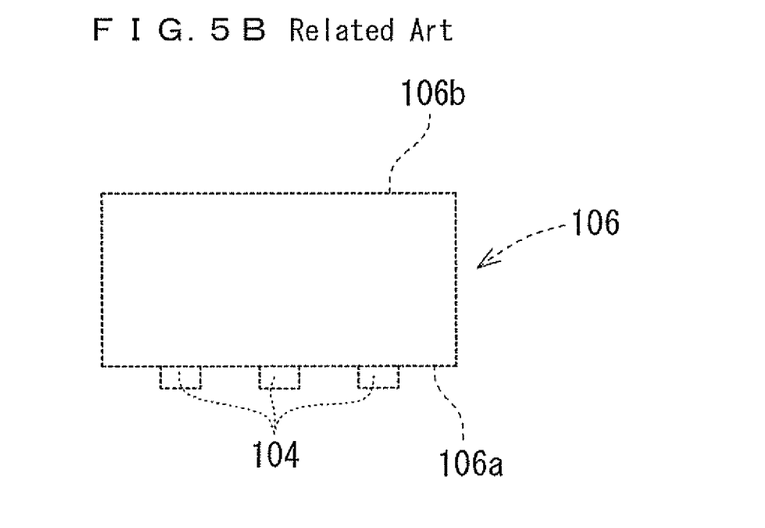
FIG. 5B is a plan view illustrating a light guiding plate where the element length is short, and LEDs.

Here, the rod integrators 100 and 102 bring light, which has been introduced into the inner portions through the light incident surface 100a and the light incident end 102a, toward the light emitting surface 100b and the light emitting end 102b while totally reflecting the light, thereby achieving the equalization of the luminance. For this reason, in order to obtain the emission of light excellent in uniformity of luminance, it is desired to further extend element length (that is, length in an optical axis direction) of the rod integrators 10, 102. Therefore, like the case of a light guiding plate 106 illustrated in FIG. 5B, when the element length of the light guiding plate 106 is short (that is, the distance between a light incident surface 106a which LEDs 104 face and a light emitting surface 106b facing the light incident surface 106a has not been sufficiently secured), in the luminance of the light emitting surface 106b, as illustrated by a curved line L in FIG. 5A, the level difference of luminance distributions according to the number of LEDs 104 and the arrangement thereof may occur over the entire light emitting surface 106b.

SUMMARY OF THE INVENTION

The present invention has been made in view of the above problem and it is an object of the present invention to improve uniformity of luminance of a light emitting surface of a light emitting device using a point-like light source, without depending on element length of a light guiding body (light guiding plate).

The following aspects of the invention exemplify the structures of the present invention. The aspects are separated to easily understand the various structures of the present invention. Each aspect does not limit a technical range of the present invention and the case where a part of components of each aspect is replaced and deleted or other components are added in consideration of a best mode to carry out the invention is included in the technical range of the present invention.

In order to achieve the object described above, according to a first aspect of the present invention, a light emitting device includes a light guiding plate that includes two facing principal surfaces and circumferential end surfaces connecting the principal surfaces; and a point-like light source that is arranged to face at least one surface of the circumferential end surfaces of the light guiding plate, wherein one surface of the circumferential end surfaces other than the surface where the point-like light source is arranged is a light emitting surface; the thickness of a portion of the light guiding plate which the point-like light source faces is smaller than the thickness of a portion constituting the light emitting surface and is smaller than the thickness of a light emitting surface of the point-like light source; a diffusing unit is formed on at least one of the principal surfaces; and a reflection member that covers peripheries of the point-like light source and the light guiding plate other than portions constituting the light emitting surfaces of the point-like light source and the light guiding plate is provided.

In the light emitting device according to this aspect, the thickness of the circumferential end portion of the light guiding plate facing the point-like light source is smaller than the thickness of the portion constituting the light emitting surface of the light guiding plate and is also smaller than the thickness of the light emitting surface of the point-like light source. Accordingly, light that has been emitted from the light emitting surface of the point-like light source will include two types of lights, that is, 1) the light introduced into the interior of the light guiding plate through the circumferential end surface portions of the light guiding plate which the point-like light source faces, and 2) the light irradiated on the principal surface without being introduced into the interior of the light guiding plate.

The light that has been introduced into the interior of the light guiding plate advances toward the light emitting surface of the light guiding plate while being totally reflected within the light guiding plate. Some of the introduced light may be emitted from the principal surface so as to go outside of the light guiding plate. Here, the light that has been irradiated on the principal surface without being introduced into the interior of the light guiding plate will keep the same angle distribution with the one when the light is emitted from the point-like light source. Among the irradiated lights, a part of the irradiated light may be introduced into the interior of the light guiding plate through the principal surface. The irradiated light that has been introduced through the principal surface may advance toward the light emitting surface of the light guiding plate while being totally reflected within the light guiding plate or being diffused by the diffusing unit. Some other parts of the irradiated light may be emitted from the principal surface so as to go outside of the light guiding plate. Here, the light that has been reflected on the principal surface and the light that has been once introduced into the light guiding plate but then emitted from the principal surface of the light guiding plate are both reflected by means of the reflection member covering peripheries of the light guiding plate except the portion constituting the light emitting surface thereof. These lights will then return to the light guiding plate, and are introduced into the interior of the light guiding plate through the principal surface thereof. Here, the light will be diffused by means of the diffusing unit whenever the light is introduced into or emitted from the light guiding plate through the principal surface thereof.

Therefore, among lights emitted from the light emitting surface of the point-like light source, both the light that has been introduced into the interior of the light guiding plate through the circumferential end surface portions facing the point-like light source and the light that has been irradiated on the principal surface without being introduced into the interior of the light guiding plate will be finally emitted from the light emitting surface of the light guiding plate thereby contributing to the uniformity of light on the light emitting surface of the circumferential end surfaces of the light guiding plate.

In the first aspect of the present invention, the light emitting device is formed such that a space is formed between the principal surface on which the diffusing unit is arranged and the reflection member.

In the light emitting device according to this aspect, the space that is formed between the principal surface where the diffusing unit is formed and the reflection member becomes a passage of the light which functions as an area to diffuse light. With this space, light that has been irradiated on the principal surface without being introduced into the light guiding plate will maintain the same angle distribution with the one when the light is emitted from the point-like light source. Accordingly, some irradiated lights may be introduced into the interior of the light guiding plate through the principal surface. Further, a part of the irradiated light that has been introduced into the light guiding plate through the principal surface may be emitted from the principal surface so as to go outside of the light guiding plate.

In the first aspect of the present invention, a light emitting device is formed such that the thickness of the portion of the light guiding plate which the point-like light source faces is not more than half the thickness of the light emitting surface of the point-like light source.

In the light emitting device according to this aspect, the thickness of the portion of the light guiding plate which the point-like light source faces is not more than half the thickness of the light emitting surface of the point-like light source. Among the light emitted from the light emitting surface of the point-like light source, a ratio of the light irradiated on the principal surface without being introduced into the light guiding plate becomes larger than a ratio of the light introduced into the interior of the light guiding plate through the circumferential end surface portions of the light guiding plate which the point-like light source faces. That is, the same angle distribution with the one when the light is emitted from the point-like light source can be maintained. Further, since the ratio of the light that has been irradiated on the principal surface without being introduced into the light guiding plate increases, uniformity of the light that is finally emitted from the light emitting surface of the light guiding plate will be advanced.

In the first aspect of the present invention, the light emitting device is formed such that the pair of principal surfaces of the light guiding plate have a non-parallel region, and the diffusing unit is formed on a surface constituting the non-parallel region.

In the light emitting device according to this aspect, the pair of principal surfaces of the light guiding plate have a non-parallel region, and light is introduced into or emitted from the light guiding plate through the principal surface of the non-parallel region. In addition, light is diffused by the diffusing unit formed on the surface constituting the non-parallel region whenever the light is introduced into or emitted from the light guiding plate through the principal surface of the non-parallel region. Accordingly, uniformity of the light that is finally emitted from the light emitting surface of the light guiding plate can be well advanced.

In the first aspect of the present invention, the light emitting device is formed such that one principal surface of the light guiding plate is a plane surface that is perpendicular to a portion of the circumferential end surface which the point-like light source faces, the other principal surface has an inclined surface, and the diffusing unit is formed on the inclined surface.

In the light emitting device according to this aspect, one principal surface of the light guiding plate has a plane surface that is perpendicular to the circumferential end surface portion which the point-like light source faces, and the other principal surface has an inclined surface. Among lights emitted from the light emitting surface of the point-like light source, a part of light is irradiated on the principal surface having the inclined surface without being introduced into the light guiding plate. The irradiated light is then diffused by the diffusing unit arranged on the inclined surface whenever the irradiated light is introduced into or emitted from the light guiding plate through the principal surface. Accordingly, uniformity of the light that is finally emitted from the light emitting surface of the light guiding plate is well advanced.

In the first aspect of the present invention, the light emitting device is formed such that, among the circumferential end surfaces of the light guiding plate, the surface which the point-like light source faces and the surface constituting the light emitting surface are configured to face each other.

In the light emitting device according to this aspect, light that has been introduced into the light guiding plate through the end surface facing the point-like light source and the light that has been irradiated on the principal surface without being introduced into the light guiding plate will trace the light paths that have been explained hereinabove. These lights are finally emitted from the light emitting surface that faces one circumferential end surface where the point-like light source is arranged.

In the first aspect of the present invention, the light emitting device is formed such that among the circumferential end surfaces of the light guiding plate, the surface where the point-like light source faces and the surface constituting the light emitting surface intersect to each other, and the point-like light source is positioned in the vicinity of the surface which faces the surface constituting the light emitting surface.

In the light emitting device according to this aspect, light that has been introduced into the interior of the light guiding plate from the surface facing the point-like light source which intersects the surface constituting the light emitting surface and the light that has been irradiated on the principal surface without being introduced into the light guiding plate will trace the light paths described above. These lights are finally emitted from the light emitting surface so as to go outside of the light guiding plate.

In the first aspect of the present invention, the light emitting device is formed in a plane view such that the length of the circumferential end surface perpendicular to the light emitting surface of the light guiding plate is shorter than the length of the circumferential end surface constituting the light emitting surface.

In the light emitting device according to this aspect, light that has been introduced into the interior of the light guiding plate through the circumferential end surfaces facing the point-like light source and the light that has been irradiated on the principal surface without being introduced into the light guiding plate will trace the light paths that have been explained hereinabove. Here, these lights will trace through: the light guiding plate where the length of the circumferential end surface constituting the light emitting surface is longer than the length of the circumferential end surface perpendicular to the light emitting surface, the light guiding plate being configured to have a rectangular shape in a plane view; the diffusing unit; and the reflection member. These lights are then emitted from the light emitting surface so as to go outside of the light guiding plate.

Since the present invention has the above-described structure, uniformity of the luminance of the light emitting surface of the light emitting device using the point-like light source can be improved without depending on the element length of the light guiding body.

BRIEF DESCRIPTION OF THE DRAWINGS

FIGS. 1A and 1B are schematic diagrams of a light emitting device according to the present invention where

FIGS. 3A and 3B are schematic diagrams illustrating another example of the light emitting device illustrated in FIGS. 1A and 1B where

FIGS. 4A and 4B are schematic diagrams of a light guiding body of a light emitting device according to the related art where FIGS. 5A and 5B are diagrams illustrating a problem when the element length of a light guiding body is short where

DETAILED DESCRIPTION OF THE PREFERRED EMBODIMENTS

Embodiments of the present invention will be hereinafter described on the basis of the drawings. In this case, the same components as those in the related art or the corresponding components in the related art are denoted by the same reference numerals and the redundant description will not be repeated.

Figure 1A:
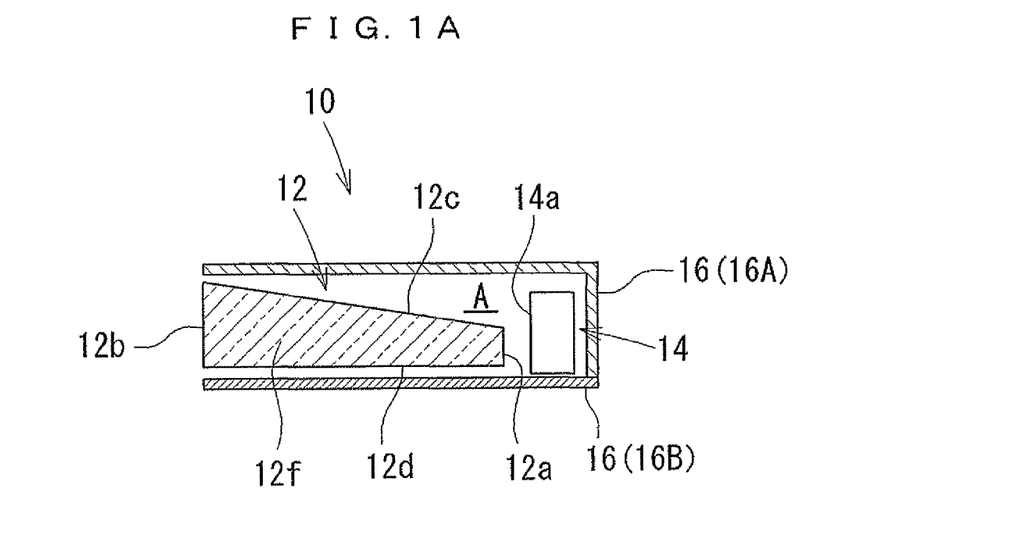
FIG. 1A is a longitudinal cross-sectional view of a light guiding plate taken in an element length direction.
Figure 1B:
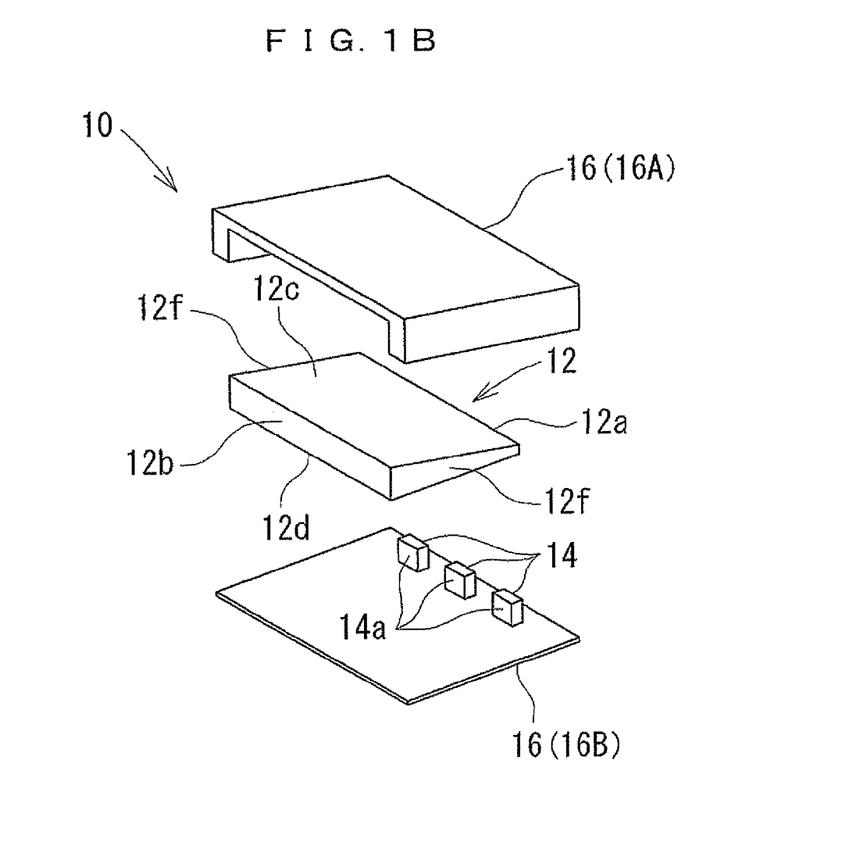
FIG. 1B is an exploded perspective view.

In the first embodiment, as illustrated in FIGS. 1A and 1B, a light guiding plate 12 of a light emitting device 10 according to an embodiment of the present invention includes two facing principal surfaces 12c and 12d (hereinafter referred to as the top principal surface 12c and the bottom principal surface 12d) and circumferential end surfaces 12a, 12b, and 12f (hereinafter referred to as the front end surface 12a, the rear end surface 12b, and the side end surface 12f) that connect the top and bottom principal surfaces 12c and 12d to each other. As a point-like light source; LEDs 14 are arranged to face the front end surface 12a of the light guiding plate 12. The rear end surface 12b that faces the front end surface 12a at which the LEDs 14 are arranged is used as a light emitting surface. The light guiding plate 12 is formed such that the thickness of the front end surface 12a that faces the LED 14 is smaller than the thickness of the rear end surface 12b constituting the light emitting surface, and is also smaller than the thickness of a light emitting surface 14a of the point-like light source 14. Therefore, the light guiding plate 12 has a wedge-shaped cross-section in which the thickness decreases as it comes to near the front end surface 12a.

In the example of FIGS. 1A and 1B, the bottom principal surface 12d of the light guiding plate 12 is formed to have a plane surface that is perpendicular to the front end surface 12a facing the LEDs 14, and the top principal surface 12c is formed to have a surface inclined relative to the bottom principal surface 12d. The top principal surface 12c of the light guiding plate 12 is configured to have a region not parallel to the bottom principal surface 12d. In addition, a diffusing unit may be formed on the inclined top principal surface 12c. The diffusing unit is configured using plural dots that have an approximately circular shape, an approximately point shape, or an approximately rectangular shape when viewed in a plane view, and are formed integrally, or are formed by printing on the top principal surface 12c. The diffusing unit is optionally configurable on the bottom principal surface 12d of the light guiding plate 12.

Figure 2:
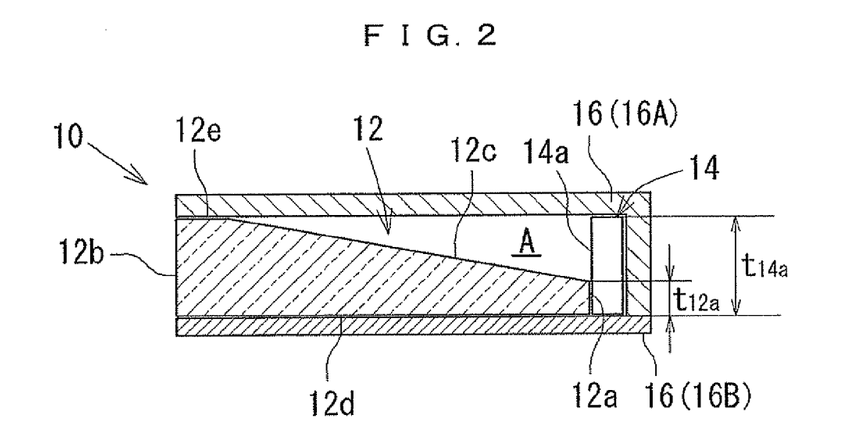
FIG. 2 is a longitudinal cross-sectional view of a light guiding plate taken in an element length direction illustrating another example of the light emitting device illustrated in FIGS. 1A and 1B.

As illustrated in FIG. 2, a surface 12e that is parallel to the bottom principal surface 12d may be optionally provided on the top principal surface 12c of the light guiding plate 12 (near side of the rear end surface 12b), whereby the thickness of the light guiding plate 12 becomes longitudinally constant in the specific region. This means that other regions of the top principal surface 12c of the light guiding plate 12 that is not parallel to the bottom principal surface 12d are arranged partially. Although illustration is omitted, the inclined surface of the top principal surface 12c may be a curved surface, instead of a plane surface, and both the top principal surface 12c and the bottom principal surface 12d may configure inclined surfaces with respect to the front end surface 12a of the light guiding plate 12 at which the LEDs 14 are arranged. In this case, the diffusing unit may be formed on both of the inclined surfaces of the top and bottom principal surfaces 12c and 12d. Preferably, the thickness $t_{12a}$ of the front end surface 12a of the light guiding plate 12 which the LED 14 faces is not more than half the thickness $t_{14a}$ of the light emitting surface 14a of the LED 14. In the embodiment of the present invention, the thickness (height) $t_{14a}$ of the light emitting surface 14a of the LED 14 is 3 mm. On the other hand, the thickness (height) $t_{12a}$ of the front end surface 12a of the light guiding plate 12 is 1 mm.

The light guiding plate 12 is formed in a plane view such that the length of the rear end surface 12b constituting the light emitting surface is longer than the one of the side end surface 12f (see FIG. 1B) perpendicular to the rear end surface 12b. In the embodiment of the present invention, the length of the rear end surface 12b is 50 mm while the length of the side end surface 12f is 20 mm.

Here, the light guiding plate 12 is a plate-shaped light guiding body made of a transparent resin material. Preferable examples of the transparent resin material of the light guiding plate 12 include a methacrylic resin, a polycarbonate resin, a polystyrene resin, a polyolefin resin, an amorphous polyolefin resin, a polyester resin, a polystyrene resin, a transparent fluoric resin, an epoxy resin, and the like. Each LED 14 is a white LED. However, the LED 14 is not limited thereto and may be a monochrome LED.

A circuit board 16B that mounts the LEDs 14 constitutes a reflection member 16 together with a housing 16A that covers the light guiding plate 12 except the light emitting surface 14a of the LED 14 and a portion constituting the rear end surface 12b of the light guiding plate 12. As described above, the light guiding plate 12 has the wedge-shaped cross-section in which the thickness thereof decreases as it comes to near the front end surface 12a facing the LEDs 14. Therefore, a wedge-shaped space A is formed between the top principal surface 12c on which the diffusing unit is arranged and the reflection member 16. In FIG. 1A, a space with a constant thickness is formed between the bottom principal surface 12d of the light guiding plate 12 and the circuit board 16B. However, the space may be removed to decrease the thickness of the light emitting device 10, similarly to the example of FIG. 2. As the same, spaces between the LED 14 and the front end surface 12a, and between the LED 14 and the housing 16A may be removed.

The housing 16A is configured using a white resin (white polycarbonate). In the circuit board 168, since a surface facing to the light guiding plate 12 is coated in white, reflection efficiency of the light is improved. Although illustration is omitted, a prism shape may be formed or a prism sheet may be arranged on the rear end surface 12b of the light guiding plate 12. Likewise, a light incident prism may be formed on the front end surface 12a of the light guiding plate 12 facing the LED 14. Each prism shape may be arbitrarily selected as long as appropriate light diffusion effects are obtainable.

In the above embodiment thus structured, the following operational effects are obtainable. That is, the light emitting device 10 is configured as that the thickness $t_{12a}$ of the front end surface 12a of the light guiding plate 12 which the LED 14 faces is smaller than the thickness of the portion constituting the rear end surface 12b, and is also smaller than the thickness $t_{14a}$ of the light emitting surface 14a of the LED 14. As a result, light that has been emitted from the light emitting surface 14a of the LED 14 includes: the light that is introduced into the front end surface 12a of the light guiding plate 12 which the LED 14 faces; and the light that is irradiated on the top principal surface 12c without being introduced into the interior of the light guiding plate 12.

The light that has been introduced into the front end surface 12a advances toward the rear end surface 12b while being totally reflected within the light guiding plate 12 or being diffused by the diffusing unit. Some parts of the introduced light may be emitted from the top principal surface 12c so as to go outside of the light guiding plate 12. Here, the light that has been irradiated on the top principal surface 12c without being introduced into the front end surface 12a will keep the same wide angle distribution with the one when the light is emitted from the LED 14. Among the irradiated lights, a part of the irradiated light may be introduced into the interior of the light guiding plate 12 through the top principal surface 12c. The irradiated light that has been introduced through the principal surface may advance toward the rear end surface 12b while being totally reflected within the light guiding plate 12. Here, some other parts of the irradiated light may be emitted from the top principal surface 12c so as to go outside of the light guiding plate 12. In addition, the light that has been reflected on the top principal surface 12c and the light that has been once introduced into the light guiding plate 12 but emitted from the top principal surface 12c will be then reflected by means of the reflection member 16, the reflection member 16 covering the peripheries of the light guiding plate 12 except the rear end surface 12b thereof. Subsequently, these lights will return to the light guiding plate 12, and are introduced into the interior of the light guiding plate 12 through the top principal surface 12c. Here, the light will be diffused by means of the diffusing unit arranged on the top principal surface 12c whenever the light is introduced into or emitted from the light guiding plate 12 through the top principal surface 12c.

As discussed, among the light that has been emitted from the light emitting surface 14a of the LED 14, both the light introduced into the interior of the light guiding plate 12 through the front end surface 12a facing the LED 14 and the light irradiated on the top principal surface 12c without being introduced into the interior of the light guiding plate 12 are finally emitted from the rear end surface 12b of the light guiding plate 12 contributing to uniform light emission on the rear end surface 12b of the light guiding plate 12.

The space A, which is formed between the top principal surface 12c on which the diffusing unit is formed and the reflection member 16, becomes a passage of the light. With this space A, among the light irradiated on the top principal surface 12c without being introduced into the light guiding plate 12, while keeping the same wide angle distribution with the one when the light is emitted from the LED 14, a part of the light is allowed to be introduced into the interior of the light guiding plate 12 through the top principal surface 12c while other parts of the light is allowed to be emitted from the top principal surface 12c so as to go outside of the light guiding plate 12.

Based on the difference of refractive indexes of the light guiding plate 12 and air of the space A (for example, 1.5:1), the space A functions as an area to help light to further diffuse without condensing the light in a narrow angle range.

The thickness $t_{12a}$ of the front end surface 12a facing the LED 14 is not more than half the thickness $t_{14a}$ of the light guiding surface 14a of the LED 14. Among the light emitted from the light emitting surface 14a of the LED 14, a ratio of the light irradiated on the top principal surface 12c without being introduced into the light guiding plate 12 becomes larger than a ratio of the light introduced into the interior of the light guiding plate 12 through the front end surface 12a. In this case, the same angle distribution with the one when the light is emitted from the LED 14 can be maintained, the ratio of the light that is irradiated on the top principal surface 12c without being introduced into, the light guiding plate 12 increases, and thus uniformity of the light that is finally emitted from the rear end surface 12b of the light guiding plate 12 can be well advanced.

The pair of top and bottom principal surfaces 12c and 12d of the light guiding plate 12 is provided with a non-parallel region, so that light is, in the non-parallel region, introduced into or emitted from the light guiding plate 12 through the top principal surface 12c. In addition, light is allowed to be diffused by means of the diffusing unit arranged on the top principal surface 12c constituting the non-parallel region whenever the light is introduced into or emitted from the top principal surface 12c. Accordingly, uniformity of the light finally emitted from the rear end surface 12b of the light guiding plate 12 can be well advanced.

In the examples of FIGS. 1A to 2, the bottom principal surface 12d of the light guiding plate 12 has a plane surface that is perpendicular to the front end surface 12a facing the LED 14. On the other hand, the top principal surface 12c has an inclined surface. Among light that has been emitted from the light emitting surface 14a of the LED 14, the light that is irradiated on the top principal surface 12c without being introduced into the light guiding plate 12 will be irradiated on the top principal surface 12c with the inclined surface. In addition, light is diffused by means of the diffusing unit arranged on the inclined top principal surface 12c whenever the light is introduced into or emitted from the light guiding plate 12 through the top principal surface 12c, whereby uniformity of the light finally emitted from the rear end surface 12b can be well advanced.

In the examples of FIGS. 1A to 2, the front end surface 12a on which the LEDs 14 are arranged and the rear end surface 12b constituting the light emitting surface are adapted to face each other. Because of this structure, the light that has been introduced into the light guiding plate 12 through the front end surface 12a facing the LEDs 14 and the light that has been irradiated on the top principal surface 12c without being introduced into the light guiding plate 12 will trace the above-explained light path until finally being emitted from the rear end surface 12b facing the front end surface 12a.

Figure 3A:
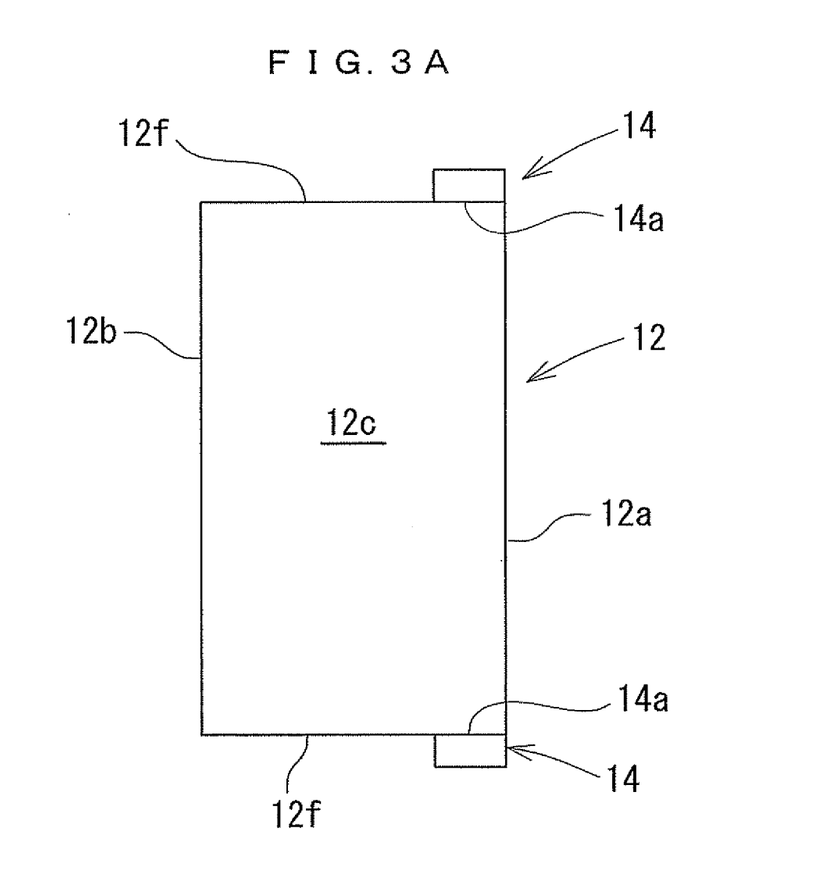
FIG. 3A is a plan view illustrating only a light guiding plate and a point-like light source.
Figure 3B:
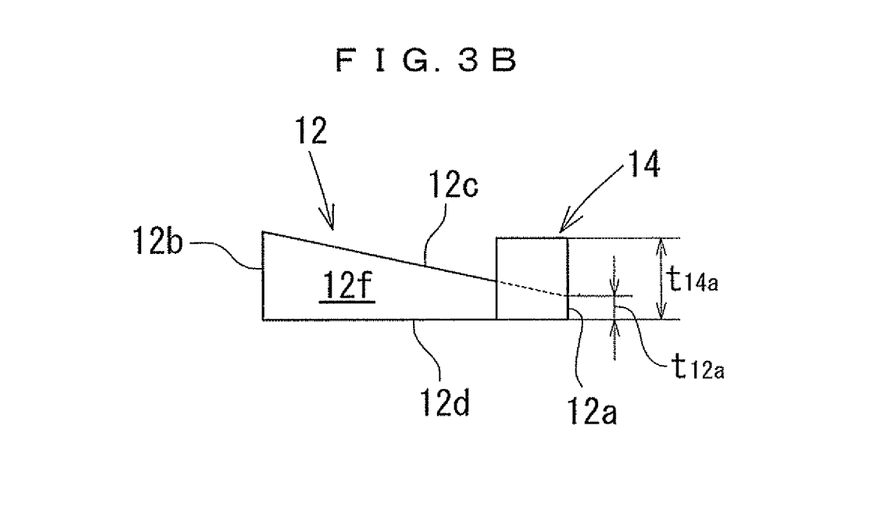
FIG. 3B is a side view thereof.

Next, in the second embodiment, as illustrated in FIGS. 3A and 3B, the light guiding plate 12 is configured as that: 1) the side end surface 12f (two facing surfaces are illustrated in the drawings, but either one of the surfaces only may be used) where the LEDs 14 are arranged and the rear end surface 12b constituting the light emitting surface intersect to each other (perpendicular to each other in the drawings when seen in a plane view); and 2) a portion of the side end surface 12f which the LED 14 (light emitting surface 14a of the LED 14) faces may be positioned in the vicinity of the front end surface 12a facing the rear end surface 12b (that is, a portion of the light emitting surface 14a of the LED 14 faces the space A). In the example of FIGS. 3A and 3B, the reflection member 16 is not illustrated to simplify the description. However, as the same with the examples of FIGS. 1A to 2, the light emitting device 10 is configured such that the reflection member is applied to cover the light guiding plate 12 except the light emitting surface 14a of the LED 14 and the portion constituting the rear end surface 12b of the light guiding plate 12.

In the examples of FIGS. 3A and 3B, the LEDs 14 are arranged on the side end surface 12f of the light guiding plate 12 that is perpendicular to the rear end surface 12b when viewed in a plane view. The LEDs 14 are positioned in the vicinity of the front end surface 12a facing the rear end surface 12b of the light guiding plate 12. The light that has been introduced into the light guiding plate 12 through the side end surface 12f perpendicular to the rear end surface 12b and the light that has been irradiated on the top principal surface 12c without being introduced into the light guiding plate 12 will trace the above-explained light path until finally being emitted from the rear end surface 12b.

Therefore, in the light emitting device 10 according to the present invention that has been explained in the first and the second embodiments, uniformity of the light that is finally emitted from the rear end surface 12b to the outside of the light guiding plate 12 can be well advanced, regardless of the case where the length of the side end surface 12f perpendicular to the rear end surface 12b is shorter than the length of the rear end surface 12b of the light guiding plate 12 constituting the light emitting surface, when the light guiding plate 12 is viewed in a plane view.

What is claimed is:

1. A light emitting device comprising:
   a light guiding plate that includes two facing principal surfaces and circumferential end surfaces connecting the principal surfaces; and
   a point-like light source that is arranged to face at least one surface of the circumferential end surfaces of the light guiding plate,
   wherein one surface of the circumferential end surfaces other than the surface where the point-like light source is arranged is a light emitting surface;
   the thickness of a portion of the light guiding plate which the point-like light source faces is smaller than the thickness of a portion constituting the light emitting surface and is smaller than the thickness of a light emitting surface of the point-like light source;
   a diffusing unit is formed on at least one of the principal surfaces; and
   a reflection member that covers peripheries of the point-like light source and the light guiding plate other than portions constituting the light emitting surfaces of the point-like light source and the light guiding plate is provided.

2. A light emitting device according to claim 1,
   wherein a space is formed between the principal surface on which the diffusing unit is arranged and the reflection member.

3. A light emitting device according to claim 1,
   the thickness of the portion of the light guiding plate which the point-like light source faces is configured to be not more than half the thickness of the light emitting surface of the point-like light source.

4. A light emitting device according to claim 1,
   wherein the pair of principal surfaces of the light guiding plate have a non-parallel region, and the diffusing unit is formed on a surface constituting the non-parallel region.

5. A light emitting device according to claim 1,
   wherein one principal surface of the light guiding plate is a plane that is perpendicular to a portion of the circumferential end surface which the point-like light source faces; the other principal surface has an inclined surface; and the diffusing unit is formed on the inclined surface.

6. A light emitting device according to claim 1,
   wherein among the circumferential end surfaces of the light guiding plate, the surface which the point-like light source faces and the surface constituting the light emitting surface are configured to face each other.

7. A light emitting device according to claim 1,
   wherein among the circumferential end surfaces of the light guiding plate, the surface where the point-like light source faces and the surface constituting the light emitting surface intersect to each other, and the point-like light source is positioned in the vicinity of the surface which faces the surface constituting the light emitting surface.

8. A light emitting device according to claim 1,
   wherein the length of the circumferential end surface perpendicular to the light emitting surface of the light guiding plate is shorter than the length of the circumferential end surface constituting the light emitting surface.

* * * * *